(12) United States Patent
Kohno et al.

(10) Patent No.: US 6,987,794 B1
(45) Date of Patent: Jan. 17, 2006

(54) RECEIVER AND RECEIVED CHANNEL ESTIMATION METHOD FOR THE SAME

(75) Inventors: Ryuji Kohno, Yokohama (JP); Satoru Ishii, Mobara (JP); Atsushi Hoshikuki, Mobara (JP)

(73) Assignee: Futaba Corporation, Mobara (JP)

( * ) Notice: Subject to any disclaimer, the term of this patent is extended or adjusted under 35 U.S.C. 154(b) by 756 days.

(21) Appl. No.: 09/589,170

(22) Filed: Jun. 8, 2000

(30) Foreign Application Priority Data

Jun. 9, 1999 (JP) .................................. 11 162747
Apr. 21, 2000 (JP) ............................. 2000-121411

(51) Int. Cl.
*H04B 1/69* (2006.01)
*H04B 1/707* (2006.01)
*H04B 1/713* (2006.01)

(52) U.S. Cl. ..................... 375/136; 375/132; 375/137
(58) Field of Classification Search ................ 375/354, 375/200, 202, 206, 367; 370/316–328
See application file for complete search history.

(56) References Cited

U.S. PATENT DOCUMENTS 5,594,735 A * 1/1997 Jokura ........................ 370/337
5,818,885 A * 10/1998 Kim ............................ 375/354
6,061,389 A * 5/2000 Ishifuji et al. ............... 375/133
6,377,609 B1 * 4/2002 Brennan, Jr. ................. 375/133

* cited by examiner

Primary Examiner—Chieh M. Fan
Assistant Examiner—Jason M. Perilla
(74) Attorney, Agent, or Firm—Oblon, Spivak, McClelland, Maier & Neustadt, P.C.

(57) ABSTRACT

A receiver is provided that can shorten the time during which initial synchronization is established. When the frequency of an output signal from the PLL 12 is set to the receiving channel corresponding to the transmission channel for a transmission signal, the time-constant switching circuit 17 changes the time constant of the loop filter 14 to a low rate mode. Meanwhile, the output signal frequency from the PLL is swept between the highest frequency and the lowest frequency signal of a frequency channel. Thus, a receiving channel corresponding to the transmission channel is estimated by signals received during the sweeping period so that the initial synchronization is established based on the estimation result. Receiving-channel estimation, to which adverse effects due to multi-path fading are reduced, can be reliably performed by selecting each of plural receiving antennas in time-divisional mode and synthesizing envelopes of received signals from respective antennas.

9 Claims, 8 Drawing Sheets

RECEIVER AND RECEIVED CHANNEL ESTIMATION METHOD FOR THE SAME

BACKGROUND OF THE INVENTION

Field of the Invention

The present invention relates to a receiver and a received channel estimation method for the same. Particularly, the present invention relates to a receiver that receives transmission signals transmitted in a frequency hopping system (technique), being one of spread spectrum communication systems (techniques).

Conventionally, the spread spectrum (SS) communication system is well known as a communication system. The spread spectrum communication system is roughly classified into a direct sequence (referred to as DS) system and a frequency hopping (referred to as FH) system.

The DS system conducts communications by DS modulating original data with a code sequence called a spread code. This system is designed to improve noise resistant characteristics by spreading the signal spectrum through the DS modulation. A pseudo noise (PN) sequence code is generally used as a code sequence for spreading the signal spectrum.

On the other hand, the FH system is the system in which communications is conducted by switching frequency channels in a pseudo random order and in a predetermined order every constant period.

Where communications are conducted using the FH system, the same hopping pattern is previously set to the receiver and the transmitter.

FIG. 11 is an explanatory diagram of the principle of the FH system.

In the FH system referring to FIG. 11, ten channels, $f_0$ to $f_9$, are prepared as frequency channels. In this hopping pattern, the frequency channel is hopped in the order of $f_0$, $f_1, f_2, \ldots, f_9, f_0, f_1, \ldots$.

For convenience in explanation, the hopping pattern is shown in a simple order of frequency channels $f_0, f_1, f_2, \ldots, f_9, f_0, f_1, \ldots$. However, an actual hopping pattern is set in such a way that a frequency channel is randomly hopped for each receiver or transmitter.

This example shows 10 frequency channels. However, 20 to 40 channels are actually prepared.

When communications between the receiver and the transmitter is achieved using the FH system, the receiver hops the received frequency (received channel) in synchronization with the transmission frequency (transmission channel) of a transmission signal transmitted from the transmitter. In order to carry out such an operation, the receiver has to establish the so-called initial synchronization which synchronizes the received frequency with the transmission frequency of the transmitter.

FIG. 12 is an explanatory diagram of an operation of establishing initial synchronization carried out in a conventional FH-system receiver.

Since the hopping pattern of a transmission signal transmitted from a transmitter to a self terminal is previously known, the synchronization between the receiver and the transmitter can be established through one-time reception of the transmission signal.

Therefore, if the transmission frequency of a transmission signal from the transmitter is hopped in the order of $f_0, f_1, f_2, \ldots, f_9, f_0, \ldots$, as shown in FIG. 12, the receiver fixes its received frequency to a given frequency channel, for example, $f_0$, of all frequency channels $f_0$ to $f_9$, thus waiting for signals from the transmitter. When the self-discrimination code is detected in the frequency channel $f_0$, synchronization between the receiver and the transmitter is established.

In the conventional synchronization establishing method, the period during which the received frequency of the receiver agrees with the transmission frequency of the transmitter becomes an initial synchronization establishing time. It is desirable to shorten the initial synchronization establishment time as much as possible.

Let us now consider where the longest time is required for initial synchronization in the conventional synchronization establishing method. For example, it is considered that the receiver becomes a receiving state in the frequency channel $f_0$ at the timing $t_1$, with which the transmitter has completely transmitted the transmission signal of a frequency of $f_0$.

If it is assumed that the time period the transmission signal from the transmitter stays in a frequency channel is $t_1$ and that the changeover time of the frequency channel is negligible, the time required for initial synchronization becomes (frequency channel number×residence time $t_1$).

Generally, 20 to 40 frequency channels are prepared in the FH system. If it is assumed that the number of channels is 40 and that the residence time $t_1$ per frequency channel is 10 ms, the longest time for initial synchronization establishment in the worst case is 400 ms (=40×10).

This means that communications between the transmitter and the receiver can be first achieved after a lapse of 400 ms from the beginning of the detection of received waves by the receiver. This results in an unrealistic communication system.

In some of actual systems, each channel residence time $t_1$ is, for example, a long period of time of several 100 ms. Such systems require several seconds for initial synchronization establishment.

As described above, the initial synchronization establishment time in the conventional FH system is determined based on the number of channels and the channel residence time $t_1$. The conventional FH system has the disadvantage of prolonging the initial synchronization establishment time proportional to the number of channels and to the residence time $t_1$.

Moreover, the receiver may not often receive transmission signals from the transmitter upon the initial synchronization establishment due to environments of the communication path between the receiver and the transmitter. The environments includes, for example, multi-path fading produced when transmission radio waves are reflected by a building and synthesized, or shadowing, interference, or the like produced when transmission radio waves are shielded by geometrical features, buildings, trees, vehicles, or the like.

In such a case, the receiver changes the frequency channel for a received frequency to again try initial synchronization establishment. This leads to more adversely prolonging the initial synchronization establishment time.

For countermeasures, it may be considered that frequency channel estimation is performed by receiving over a broad band of all frequency channels in the FH system at an operation for initial synchronization establishment and then digital processing them by the digital signal processor. However, this approach requires digital signal processing circuits LSI or high-speed A/D converters, that can deal with high-speed digital signal processing, thus resulting in increased costs.

Since broadening the received band leads to widening the thermal noise received frequency band, the thermal noise energy $W_N$ ($W_N = k \times T \times B$, where k is the Boltzmann constant, T is an absolute temperature, and B is a band width)

increases. As a result, there is the disadvantage in that the receiving sensitivity of the receiver decreases because Eb/No (where Eb is energy per bit and Nb is noise) decreases.

Moreover, when a multi-path fading exists, the signal strength of a received signal greatly varies locally and over time. There is the problem in that since the signal strength of a received signal depends on frequency, the receiving side cannot accurately estimate a frequency channel being used for transmission even if the signal strength of each frequency channel is merely detected at the operation for initial synchronization establishment.

However, it is known that the signal strength varies independently when two receiving spots are spaced away by about $\lambda/2$ (where $\lambda$ is wavelength) in the multi-path fading. Conventionally, the receiving antenna diversity technique is known by noting the above phenomenon.

For that reason, it is considered that the adverse effect due to fading can be reduced even in the operation for initial synchronization establishment, provided that signals received by receiving antennas, respectively disposed at plural receiving spots spaced apart a predetermined distance, are used.

There is a first technique for the receiving antenna diversity (branch configuration method) to perform the feedback control on the received signal quality. In the first technique, a changeover switch selects one of plural receiving antennas to measure received signal power or bit error rate. Then, another receiving antenna is selected when the quality of a received signal is less than a predetermined value. However, this method leads to a large delay for processing. Moreover, when a received signal is not determined, the received signal quality cannot be evaluated.

In the second technique for the receiving antenna diversity (synthesis receiving method), signals received with plural receiving antennas amplify respectively and the frequency-converted received signals are synthesized in the highest ratio. However, this method requires not only high-frequency amplifiers in the number corresponding to the number of the receiving antennas but also complicated control. Moreover, there is the technique called "software antenna". However, this method also requires complicated control.

SUMMARY OF THE INVENTION

The present invention is made to solve the above-mentioned problems.

Moreover, the objective of the invention is to provide a receiver that can shorten the time period needed for establishment of initial synchronization and can be realized at low costs and in a simplified configuration.

Another objective of the invention is to provide a received channel estimation method that can shorten the time period needed for establishment of initial synchronization and can be realized at low costs and in a simplified configuration.

Still another objective of the present invention is to provide a receiver that is insensitive to multi-path fading and can realize reliable received channel estimation at low costs and in a simplified configuration.

According to the present invention, a receiver that receives transmission signals transmitted in a communication system using plural frequency channels, comprises a phase locked loop (PLL) being formed of differential information output means for frequency dividing an input signal in a predetermined frequency division ratio to obtain a frequency-divided signal and for outputting differential information between the frequency-divided signal and a clock pulse, filter means for outputting a differential signal voltage corresponding to the differential information, and a voltage-controlled oscillator for controlling the frequency of an output signal according to the differential signal voltage; receiver means for receiving the transmission signal as a local oscillation frequency the frequency of an output signal output from the PLL; estimation means for estimating a receiving channel corresponding to the transmission channel of the transmission signal; and control means for controllably switching the frequency of the output signal from a receiving channel at one terminal to receiving channel at another terminal when the frequency of an output signal from the PLL is set to the frequency of a receiving channel corresponding to the transmission channel of the transmission signal; wherein the estimation means estimates a receiving channel corresponding to a transmission channel for the transmission signal based on the received signal received by the receiver means, in the period during which the PLL changes from a receiving channel at one terminal to a receiving channel at the other terminal.

Moreover, according to the present invention, a receiver that receives transmission signals transmitted in a communication system using plural frequency channels, comprises a phase locked loop (PLL) being formed of differential information output means for frequency dividing an input signal in a predetermined frequency division ratio to obtain a frequency-divided signal and for outputting differential information between the frequency-divided signal and a clock pulse, a first filter to which a first time constant is set, a second filter to which a second time constant slower than the first time constant is set, filter means for outputting a differential signal voltage corresponding to the differential information, and a voltage-controlled oscillator for controlling the frequency of the output signal according to the differential signal voltage; time-constant switching means for switching the time constant of the filter means; receiver means for receiving the transmission signal having as a local oscillation frequency the frequency of an output signal output from the PLL; estimation means for estimating a receiving channel corresponding to the transmission channel of the transmission signal; and control means for performing switching control such that the time-constant switching means switches the filter means from the first filter to the second filter when the frequency of an output signal from the PLL is set to the frequency of a receiving channel corresponding to the transmission channel of the transmission signal and for controllably switching the frequency of an output signal output from the PLL from a receiving channel at one terminal to a receiving channel at the other terminal; wherein the estimation means estimates a receiving channel corresponding to the transmission channel for the transmission signal based on the received signal received by the receiver means, in the period during which the second filter changes at low rate an output signal output from the PLL from a receiving channel at one terminal to a receiving channel at the other terminal.

Moreover, according to the present invention, a received channel estimation method for a receiver, the method estimating a receiving channel corresponding to a transmission channel for a transmission signal transmitted in a communication system using plural frequency channels, comprises the steps of controllably switching the frequency of the output signal from a received channel on one terminal to a received channel on other terminal when the frequency of an output signal from the PLL is set to a receiving channel corresponding to the transmission channel of the transmission signal; and estimating a receiving channel corresponding to the transmission channel based on the received signal received during the switching period.

Furthermore, according to the present invention, a received channel estimation method for a receiver, the method estimating a receiving channel corresponding to a transmission channel for a transmission signal transmitted in a communication system using plural frequency channels, comprises the steps of switching the time constant of a filter in the PLL from a first time constant to a second time constant when the frequency of an output signal from the PLL is set to a receiving channel corresponding to the transmission channel of the transmission signal; switching at a low rate the frequency of an output signal from the PLL from a receiving channel at one terminal to a receiving channel at the other terminal; and estimating a receiving channel corresponding to the transmission channel based on the received signal received during the switching period.

As described above, according to the present invention, when the frequency of an output signal output from the PLL is set to a receiving channel corresponding to a transmission channel for a transmission signal, the frequency of the output signal is switched from a receiving channel at one terminal to a receiving channel for the other terminal. Thus, the receiving channel corresponding to the transmission channel is estimated in a short time based on a receiving signal received during the switching period.

Since the initial synchronization of the receiver can be established using the estimation result on the receiving channel, the time required for the initial synchronization can be shortened.

Moreover, a receiver that receives transmission signals transmitted in a communication system using plural frequency channels, comprises a plurality of receiving antennas for receiving the transmission signals; a switching circuit for selectively switching outputs from the plurality of receiving antennas in a time-division mode to output received signals; a phase locked loop (PLL) for outputting frequency-controlled output signals; receiver means for receiving the received signal from the switching circuit using as a local oscillation signal the output signal output from the PLL; estimation means for estimating a receiving channel corresponding to the transmission channel of the transmission signal; and control means for controllably switching the frequency of the output signal from the PLL, from a receiving channel at one terminal to a receiving channel at other terminal when the frequency of an output signal from the PLL is set to a local oscillation frequency according to a receiving channel corresponding to the transmission channel for the transmission signal; wherein the estimation means includes signal strength measuring circuit for measuring the signal strength of the received signal every unit period during which each of outputs of the received antennas is selected and then synthesizing the signal strengths over the unit selection period; the estimation means estimating a receiving channel corresponding to the transmission channel for the transmission signal based on a synthesized signal strength in the period during which the frequency of the output signal from the PLL is changed to a local oscillation frequency corresponding to a receiving channel at one terminal and a receiving channel at the other terminal.

Moreover, according to the present invention, a receiver that receives transmission signals transmitted in a communication system using plural frequency channels, comprises a plurality of receiving antennas for receiving the received signals; a switching circuit for selectively switching outputs from the plurality of receiving antennas in a time-division mode to output a received signal; a phase locked loop (PLL) for outputting frequency-controlled output signals, the PLL including a loop filter; receiver means for receiving the received signal from the switching circuit, using as a local oscillation signal the output signal output from the PLL; estimation means for estimating a receiving channel corresponding to the transmission channel of the transmission signal; and control means for switching the time constant of the loop filter when the frequency of an output signal from the PLL is set to the local oscillation frequency according to a receiving channel corresponding to the transmission channel of the transmission signal and controllably switching the frequency of the output signal from the PLL, from a receiving channel at one terminal to a receiving channel at other terminal; wherein the estimation means includes signal strength measuring means for measuring the signal strength of the received signal every unit selection period during which the output of each of the receiving antennas is selected, and synthesizing the signal strengths over the unit selection period, the estimation means estimating a receiving channel corresponding to the transmission channel for the transmission signal based on the signal strength synthesized in the period during which the filter changes the frequency of the output signal from the PLL, to a local oscillation frequency corresponding to a receiving channel at one terminal and a receiving channel at the other terminal.

As described above, according to the present invention, receiving-channel estimation is performed by selectively switching in a time division mode received signals output from plural receiving antennas, each which receives a transmission signal, and then measuring the signal strength of the received signal every unit selection period during which the output of a receiving antenna is selected.

For that reason, the adverse effect due to multi-path fading can be decreased. The initial synchronization of the receiver is established using the received channel estimation result so that the time required for initial synchronization can be shortened.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Receivers according to embodiments of the present invention will be described below with reference to the attached drawings.

In embodiments, a frequency hopping system for spread spectrum communication will be shown as a communication system.

Figure 1:
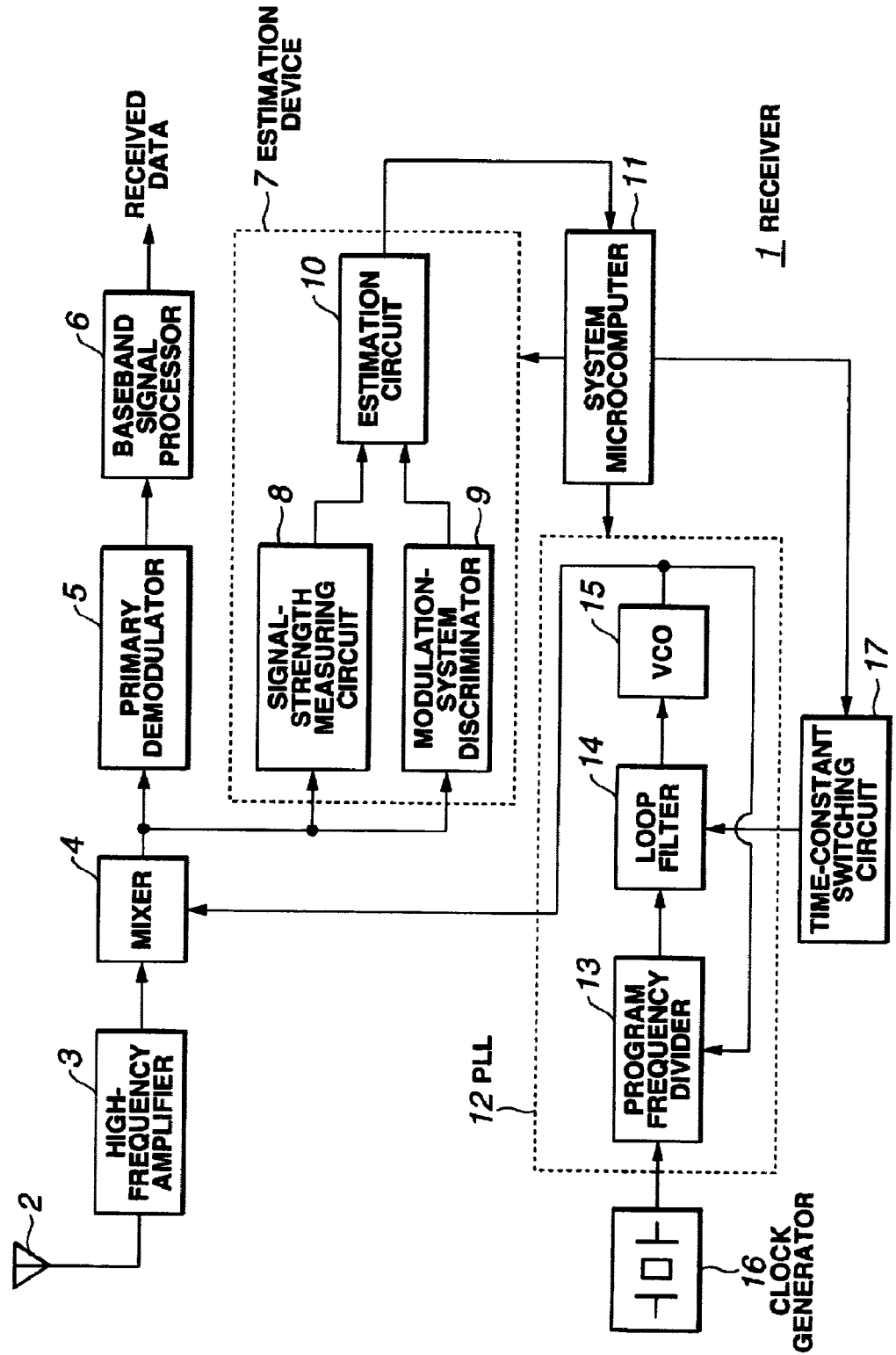
FIG. 1 is a block diagram illustrating a receiver for communications in a frequency hopping system, according to an embodiment of the present invention.

FIG. 1 is a block diagram illustrating a receiver according to an embodiment of the present invention.

In a receiver 1 shown in FIG. 1, an antenna 2 supplies a frequency-hopping signal (hereinafter referred to as FH signal) to a high-frequency amplifier 3. The high-frequency amplifier 3 amplifies the frequency-hopping signal and then outputs the amplified signal to a mixer 4.

The mixer 4 mixes the FH signal amplified by the high-frequency amplifier 3 with an output signal (local oscillation signal) from a phase locked loop (PLL) 12 (to be described later). Thus, the mixer 4 subjects the FH signal to inverse spread to convert into a constant intermediate frequency. The converted signal is output to a primary demodulator 5 via a bandpass filter (BPF) (not shown).

The primary demodulator 5 executes demodulation corresponding to frequency modulation (FSK) or phase modulation (PSK) carried out by the primary modulator in a transmitter (to be described later). Thus, the primary demodulator 5 outputs the demodulated signal to a baseband signal processor 6.

The baseband signal processor 6 error-corrects the signal output from the primary demodulator 5, thus obtaining received data corresponding to the baseband signal (transmission data) from the transmission side.

Estimation means 7 (enclosed with broken lines) consists of a signal strength measuring circuit 8, a modulation-system discrimination circuit 9 and an estimation circuit 10. The estimation circuit 7 operates to establish initial synchronization (to be described later).

The signal strength measuring circuit 8 measures the strength of a received signal converted into an intermediate frequency by the mixer at an operation for initial synchronization establishment.

Like the primary demodulator 5, the modulation-system discrimination circuit 9 includes, for example, a demodulator that can decide frequency modulation (FSK) or phase modulation (PSK) executed by the primary modulator in the transmitter. The modulation-system discrimination circuit 9 identifies whether or not the modulation system executed to the received signal converted into an intermediate frequency by the mixer 4 is the same modulation system, at the operation for initial synchronization establishment.

The estimation circuit 10 holds, for example, a hopping pattern previously set to the receiver according to the present embodiment. The estimation circuit 10 estimates whether or not the received signal is the FH signal (referred to as desired wave signal) transmitted to the receiver 1, based on the hopping pattern, the signal strength (level) of a received signal measured with the signal strength measuring circuit 8 and a decision result of the modulation-system discrimination circuit 9.

The PLL 12 (enclosed with broken lines) is formed of a program frequency divider 13, a loop filter 14, and a voltage controlled oscillator 15 (hereinafter referred to as VCO). A closed loop is formed of the program frequency divider 13, the loop filter 14 and the VCO 15 to feed back the output of the VCO 15 to the program frequency divider 13.

A frequency division ratio in which the VCO 15 operates to output a local oscillation signal corresponding to a predetermined hopping pattern is previously programmed for each receiver. The program frequency divider 13 frequency divides the input signal input from the VCO 15 in a predetermined frequency division ratio, compares the frequency-divided signal with clock signals from the clock generator configured of, for example, a quartz crystal oscillator, and then outputs the comparison result as information about error.

The loop filter (low-pass filter) 14 includes two filters (first filter and second filters) each having a different time constant. Each filter (not shown) is a CR filter formed of a capacitor and a resistor. The loop filter 14 converts a difference voltage signal regarding error information from the program frequency divider 13 into a DC voltage and then outputs the converted signal to the VCO 15.

The first filter in the loop filter 14 is used to conduct normal data communications in the FH system between the receiver 1 of the present embodiment and the transmitter. The time constant is set to a relatively high rate to sufficiently follow the hopping frequency.

The second filter is used at an operation for initial synchronization establishment (to be described later) and the time constant thereof is set to a lower rate than that of the first filter.

The oscillation frequency of the VCO 15 is controlled by the difference voltage signal supplied through the loop filter 14. The output of the VCO 15 is fed back to the program frequency divider 13 and is output as an oscillation signal to the mixer 4.

The time constant switching circuit 17 selectively controls the first and second filters in the loop filter 14 under control of the system microcomputer 11.

The system microcomputer 11 controls the estimation means 7 and the PLL 12 at the operation for initial synchronization establishment. The operation of establishing initial synchronization will be described later.

Figure 2:
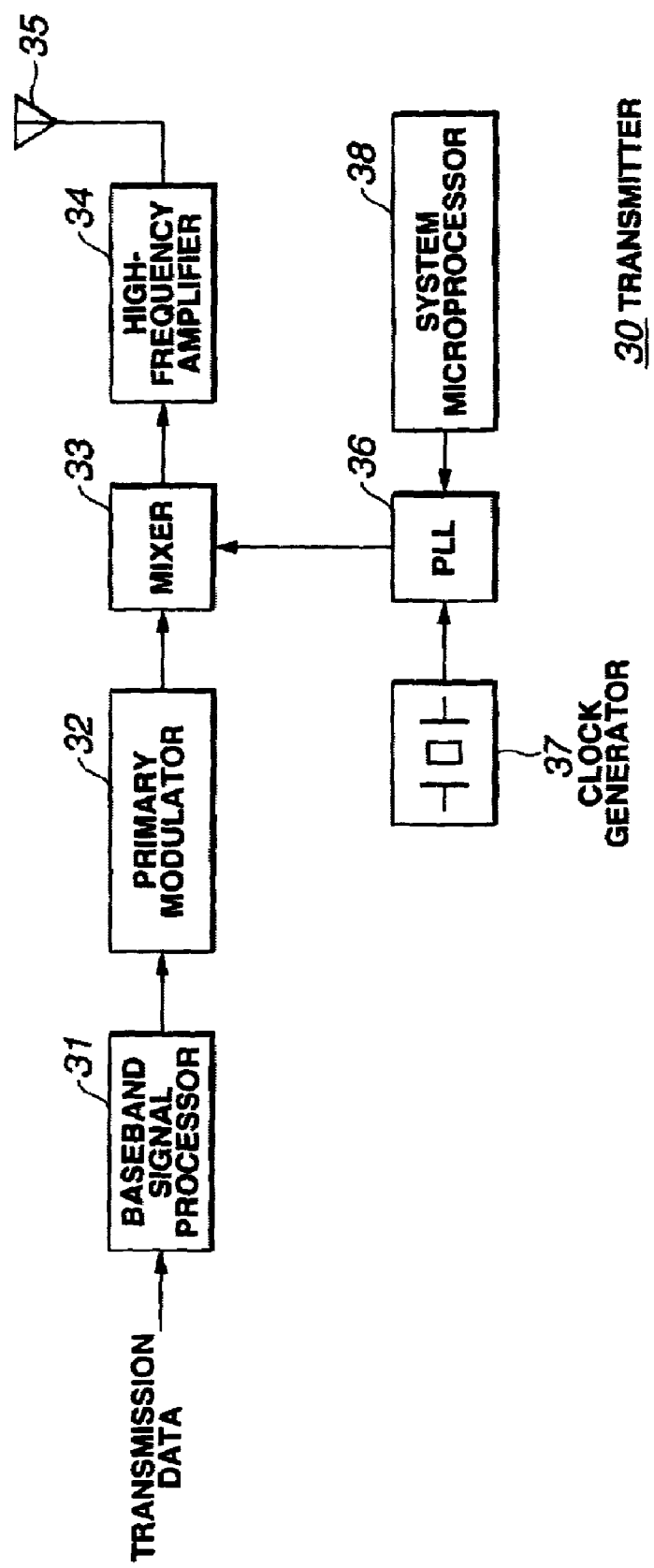
FIG. 2 is a block diagram illustrating a transmitter placed to the receiver according to the embodiment of the present invention.

FIG. 2 is a block diagram illustrating the transmitter corresponding to the receiver in the FH system shown in FIG. 1.

In the transmitter 30 shown in FIG. 2, the baseband signal processor 31 performs a predetermined signal process of transmission data and then outputs the resultant signal to the primary modulator 32.

The first modulator 32 subjects the signal to digital narrow band modulation such as frequency modulation (FSK) and outputs the modulated signal to the mixer 33. The mixer 33 frequency-modulates the modulated signal based on the output signal from the PLL 36.

The PLL 36 creates a local oscillation signal based on clock pulses from the clock generator 37.

The PLL 36 creates local oscillation signals based on the clock pulses from the clock generator 37. In this case, the PLL 36 varies in time the frequency of the local oscillation signal according to a predetermined hopping pattern under control of the system microcomputer 38. The resultant output signal is output as a transmission frequency to the mixer 33.

Hence, the mixer 33 frequency-converts the signal narrow-band modulated by the primary modulator 32 into a transmission frequency corresponding to the hopping pattern. The high-frequency amplifier 34 amplifies the frequency-converted signal and then transmits it via the transmission antenna 35. That is, the FH system transmitter 30 transmits the transmission signal as a spectrum spread signal having a broad spread frequency band.

Next, the operation for initial synchronization establishment of the receiver 1 according to the embodiment shown in FIG. 1 will be explained with reference to FIGS. 3 to 5.

Figure 11:
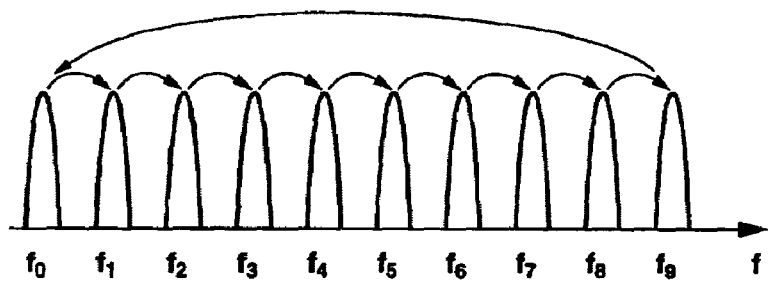
FIG. 11 is an explanatory diagram of the principle of a frequency hopping system.
Figure 12:
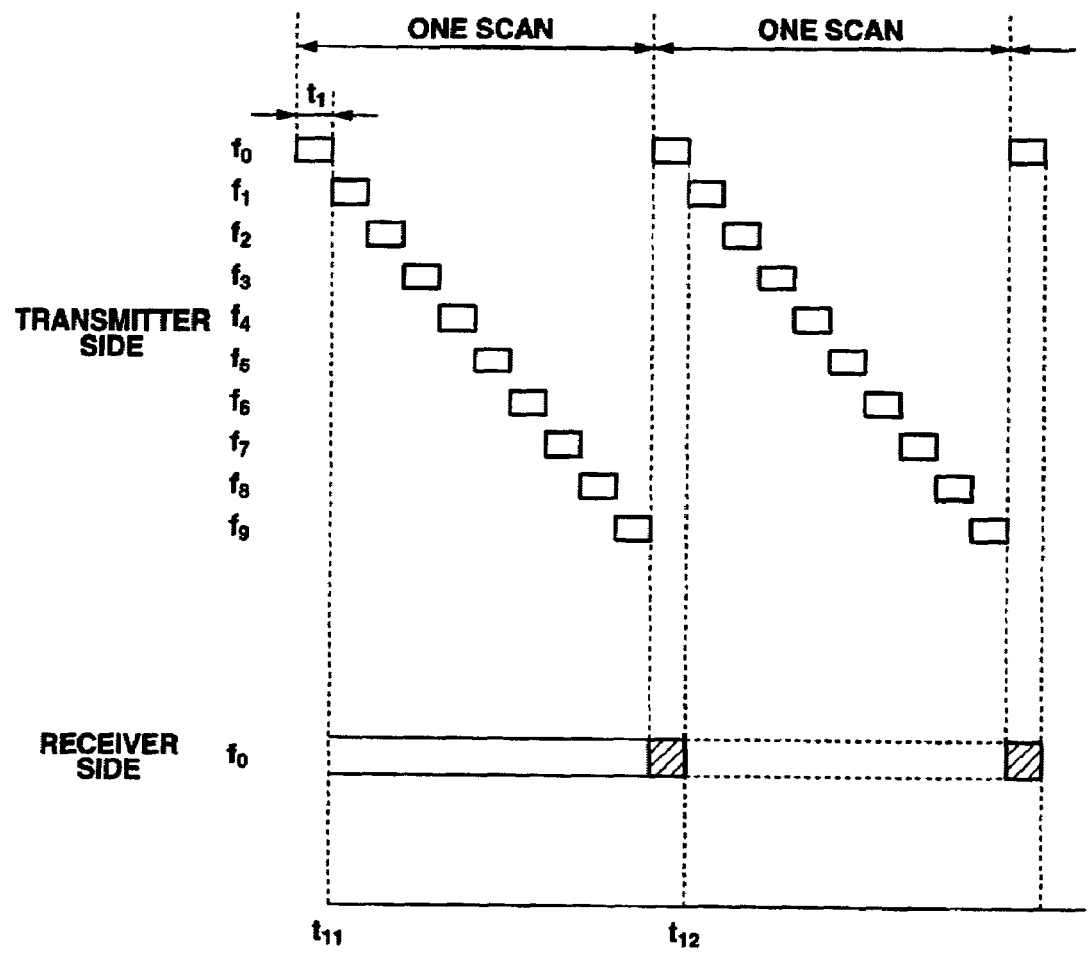
FIG. 12 is an explanatory diagram of a conventional operation for initial synchronization establishment.

For convenience in explanation, it is assumed that the FH system in the present embodiment has 10 channels, as previously explained with FIGS. 11 and 12. Moreover, it is assumed that the hopping pattern in the FH system for transmission and reception is a pattern in which the frequency channel is hopped in the order of $f_0, f_1, f_2, \ldots, f_9, f_0$.

Where communications in the FH system are conducted between the receiver 1 and the transmitter 30 according to the present embodiment, the receiver 1 first operates for initial synchronization establishment to establish synchronization with the hopping pattern between the receiver 1 and the transmitter 30.

In this case, the system microcomputer 11 in the receiver 1 controls the time-constant switching circuit 17. The time-constant switching circuit 17 selects the second filter with a slow time-constant in the loop filter 14. Under the changed state, the system microcomputer 11 controls the PLL 12 and the estimation means 7, as described below.

Here, the control of the PLL 12 executed by the microcomputer 11 at the operation for initial synchronization establishment will be explained below as an example.

In this case, the system microcomputer 11 controls to sample (sweep) the frequency of a local oscillation signal output from the PLL 12 over the band of all frequency channels used in the FH system of the present embodiment.

For example, the system microcomputer 11 first sets the frequency division ratio of the program frequency divider 13 to make the frequency of an oscillation signal output from the VCO 15 to the lowest frequency channel $f_0$. At the time $t_1$ the frequency of an oscillation signal output from the VCO 15 reaches the frequency channel $f_0$, as shown in FIG. 3, the system microcomputer 11 sets the frequency division ratio of the program frequency divider 13 to make the frequency of an oscillation signal output from the VCO 15 to the highest frequency channel $f_9$. Since the PLL 12 is in a low rate time constant, the VCO 15 changes to the frequency $f_9$ at a relatively low rate.

At the time $t_2$ the frequency of the oscillation signal output from the VCO 15 reaches the frequency channel $f_9$, the system microcomputer 11 sets the frequency division ratio of the program frequency divider 13 to reset the frequency of an oscillation signal output from the VCO 15 to the lowest frequency channel $f_0$.

Figure 3:
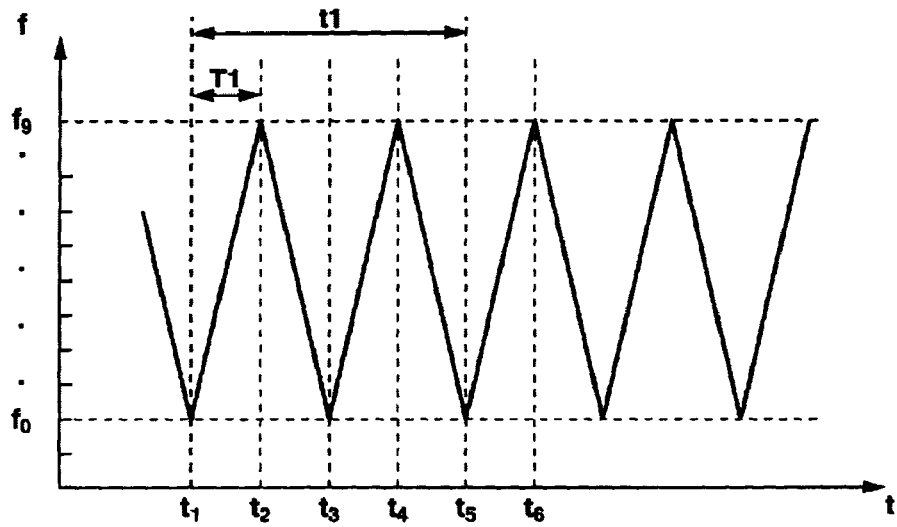
FIG. 3 is a waveform diagram illustrating output signals from the PLL when the initial synchronization of the receiver is established, according to an embodiment of the present invention.

Continuation of the above-mentioned control allows the frequency of a local oscillation output from the PLL 12 to be swept between the highest frequency channel $f_9$ and the lowest frequency channel $f_0$, as shown in FIG. 3.

At this time, during the sweep period T1, the frequency of the VCO 15 is once swept over all the channel frequencies $f_0$, to $f_9$. One sweep period (sampling period) T1 is set within the residence time $t_1$ of one frequency channel in a hopping pattern by changing the loop filter 14 to the second filter which operates at a low rate. The sweep period T1 is set based on the time constant of the second filter in the loop filter 14.

Moreover, the system microcomputer 11 controls the sweeping of a local oscillation signal output from the PLL 12 while it controllably operates the estimation means 7. In this case, the received signal received by the mixer 4 is sent to the signal strength measuring circuit 8 and the modulation-system discrimination circuit 9 in the estimation means 7, with the frequency timing of a local oscillation signal output from the PLL 12.

Figure 4:
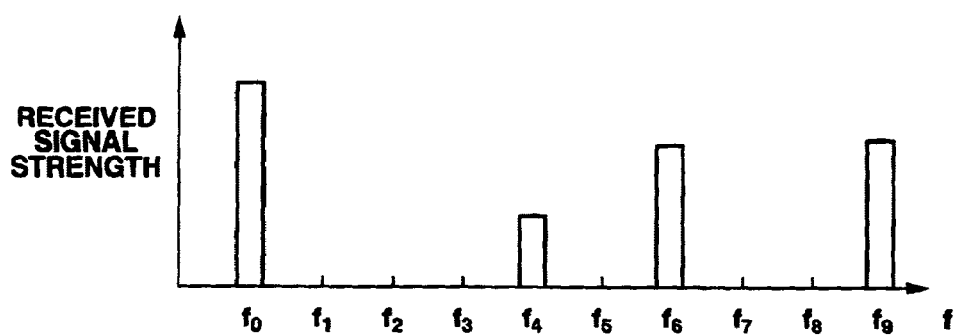
FIG. 4 is a diagram illustrating signal waves detected by the signal strength measuring circuit when the initial synchronization of the receiver is established, according to an embodiment of the present invention.

FIG. 4 is a diagram illustrating the received strength of a received signal measured with the signal strength measuring circuit 8 through the first sampling operation.

The signal strength measuring circuit 8 measures the signal strength of a received signal of which the frequency is converted into an intermediate frequency by the mixer 4. Hence, as shown in FIG. 4, received signals with different receive strengths (levels) are obtained according to the frequency spectrum having frequency channels $f_0, f_4, f_6$ and $f_9$.

Figure 5:
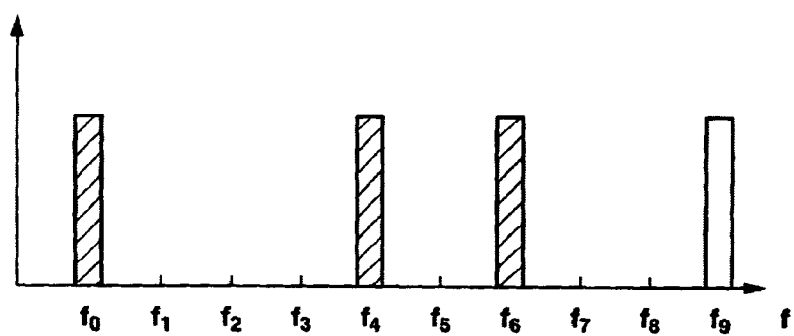
FIG. 5 is a diagram illustrating results detected by the modulation mode discrimination circuit when the initial synchronization of the receiver is established, according to an embodiment of the present invention.

FIG. 5 is a diagram illustrating the modulation system to the received signal that is discriminated with the modulation-system discriminator 9 through the first sampling operation.

The modulation-system discriminator 9 identifies the same modulation system (hereinafter merely referred to as same modulation system) as the FH system according to the present embodiment, with the received signal having the same frequency spectrum as that in the signal strength measuring circuit 8.

FIG. 5 shows that the received signals (hatched) with the frequency channels $f_0, f_4$ and $f_6$ are identified to be signals according to the same modulation system. FIG. 5 also shows that the received signal with the frequency $f_9$ is identified to be one modulated in a different modulation system.

The estimation circuit 10 estimates whether or not the received signal is a desired wave signal transmitted to the receiver, based on the signal strength sent from the signal strength measuring circuit 8 and the decision result on modulation system sent from the modulation-system discrimination circuit 9.

For example, if the estimation circuit 10 receives the detection result, shown in FIG. 4, from the signal strength measuring circuit 8 and the detection result, shown in FIG. 5 from the modulation-system discriminator 9, it estimates that a specific one of the frequency channels $f_0, f_4$ and $f_6$ is a desired wave signal, based on the signal strength and the modulation system.

In this case, the system microcomputer 11 estimates that a specific one of the received signals $f_0, f_4$ and $f_6$ is a desired wave signal. Then the system microcomputer 11 controls the time-constant switching circuit 17 to change the second filter to the first filter used in a normal operation in the loop filter 14, thus receiving the desired wave signal.

It is finally judged whether or not the desired wave signal is a desired wave signal based on the information data contained within one frame of the desired wave signal. If yes, it is judged that the initial synchronization has been established so that communications with the transmitter are conducted.

If information data contained within one frame of an estimated desired wave signal finally indicates that the estimated desired wave signal is not a desired wave signal, one of the remaining desired wave signals estimated by the estimation circuit 10 is first estimated again as a desired wave signal. Thus, the desired wave decision process is further repeated. The received signal, finally estimated as a desired wave signal by the estimation circuit 10, is judged to be a desired wave signal of interest.

Regarding received signals detected with the signal strength measuring circuit 8 and the modulation-system discriminator 9, there are other transmission radio waves with which communications are conducted using different hopping patterns even in the same system. Hence, plural received signals modulated in the same modulation system, as shown in FIGS. 4 and 5, may be estimated through one-time sweeping (sampling).

In such a case, one-time sweeping (sampling) allows a desired wave signal to be estimated in a very short time. However, in order to establish initial synchronization by identifying a target desired wave signal of plural estimated desired wave signals, it is needed to judge identification data contained within each estimated desired wave signal. This process takes long time to establish initial synchronization.

In other words, by improving the estimation accuracy of desired wave signal by the estimation circuit 7, the time for initial synchronization establishment can be shortened.

Next, the method by which the estimation means 7 can reliably estimate a desired wave signal of interest will be explained below.

In order to reliably estimate a desired wave signal by the estimation means 7, the time constant of the second filter in the loop filter 14 is previously set in such a way that the sampling period T1 of a local oscillation signal output from the PLL 12 is a fraction of the residence time $t_1$ of a frequency in a hopping pattern.

At an operation for initial synchronization establishment, the program frequency divider 13 is controlled to execute continuous sampling operations plural number of times and for the time corresponding to at least several times the residence time $t_1$ of the hopping pattern.

The estimation circuit 10 in the estimation means 7 estimates a desired wave signal for the receiver 1 based on the results obtained through plural sampling operations of the signal strength measuring circuit 8 and the modulation-system discriminator 9.

Figure 6:
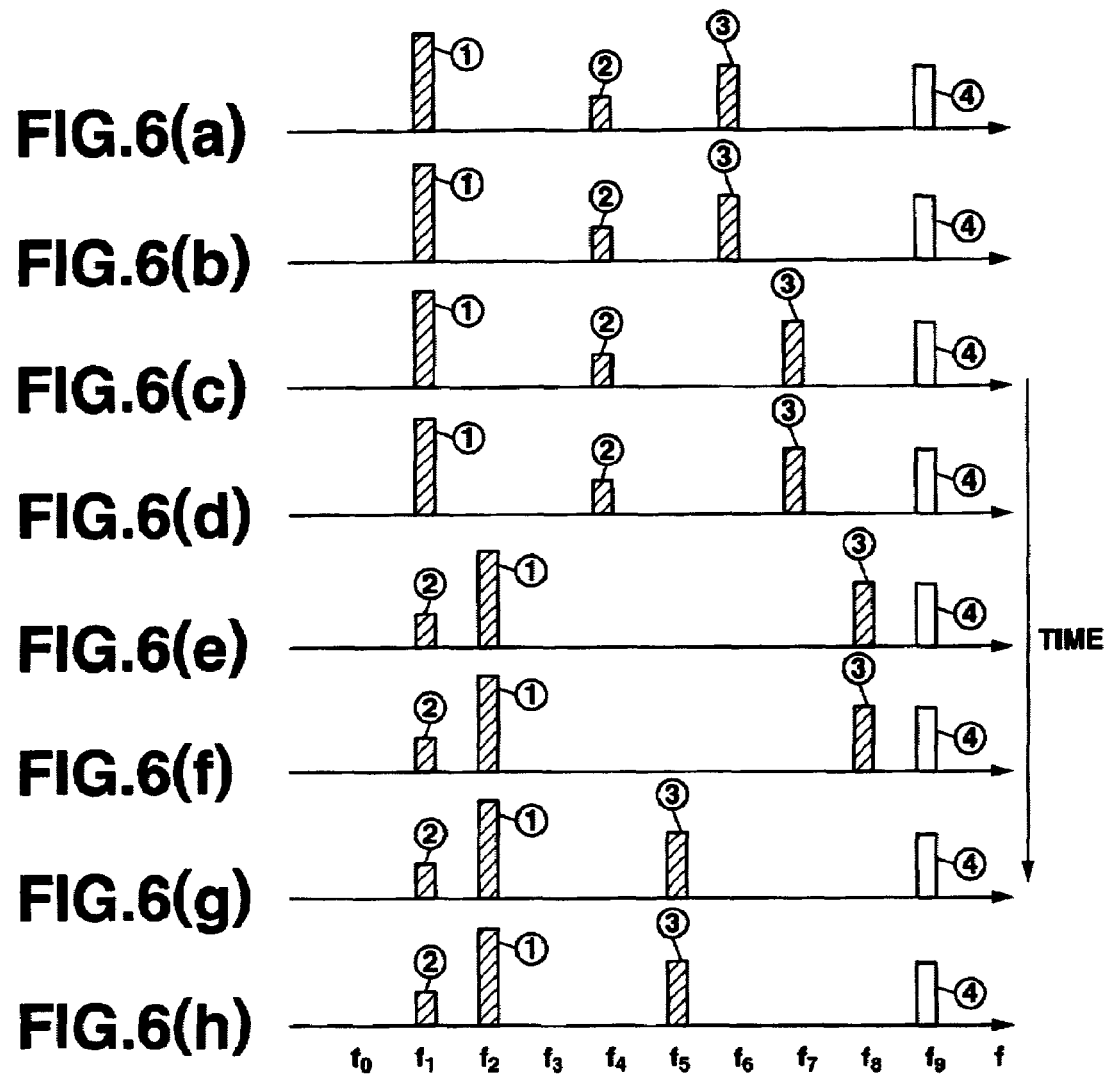
FIG. 6 is a diagram illustrating signal waveforms obtained by the estimation circuit when the initial synchronization of the receiver is established, according to an embodiment of the present invent.

FIG. 6 is a diagram illustrating signal waveforms (spectrum) obtained in each sampling when the estimation circuit 10 executes eight continuous sampling operations for ¼ of the residence time $t_1$ of one frequency in a hopping pattern.

Signal waveforms shown in FIGS. 6(a) to 6(h) are arranged in the upward sweeping direction of $f_0$ to $f_9$.

The spectrum received in the downward sampling direction of $f_9$ to $f_0$ is temporarily stored in a memory (not shown), and then are rearranged in the upward direction.

Referring to FIG. 6, hatched bars show signals regarded as the same modulation system by the modulation-system discriminator 9. The length of each bar indicates the signal strength measured by the signal strength measuring circuit 8.

Referring to FIGS. 6(a) to 6(h), symbols ① to ④, labeled to bars, are indicated as the same signals, respectively. Any one of the signals ① to ④ detected in each sampling operation can be identified even when the frequency channel is different based on the modulation system and signal strength (level) of a signal received by the estimation circuit 10 in each sampling operation.

In this case, the estimation circuit 10 first estimates that the signal ④ is clearly not a desired wave signal because the signal ④ is different in modulation system and then estimates the desired wave signal based on the remaining signals ① to ③.

Next, the estimation circuit 10 handles the hopping period of the signals ① to ③.

According to the present embodiment, it is assumed that the sampling period is ¼ of the residence time $t_1$ of a frequency of a hopping pattern in the FH system. Hence, signals from the receiver in the same system are supposed to have the same frequency channel over four sampling periods.

Referring back to FIG. 6, the frequency channels of the signals ① and ② vary with four sampling periods. The frequency channel of the signal ③ varies (hops) with two sampling periods.

According to the facts, it is estimated that the signal ③ is a signal according to another system different in the residence time $t_1$ and that the signals ① and ② are signals according to the same system as that in the receiver 1 of the present embodiment.

Next, the estimation circuit 10 handles the hopping pattern of the frequency of a received signal. In the hopping pattern previously set to the receiver 1 of the present embodiment, as described earlier, the frequency channel hops in the order of $f_0, f_1, f_2, \ldots, f_9, f_0, f_1, f_2, \ldots$ If the signal ① or ② is a desired wave signal, the frequency channel varies with the same hopping pattern.

Referring back to the signals ① and ②, with an attention on the above hopping pattern, the frequency channel of the signal ① varies from $f_1$ to $f_2$ while the signal ② varies $f_4$ to $f_1$. It is estimated that the signal ① of which the frequency channel varies with the same hopping pattern as the self hopping pattern is a desired wave signal.

As described above, a desired wave signal of interest can be positively estimated using the self hopping pattern or hopping timing even when plural received signals have been received.

In the above operation, the system microcomputer 11 controls the time-constant switching circuit 17 at the time estimation circuit 10 has estimated a desired wave signal, for example, with a sampling timing of the frequency channel $f_2$, as shown in FIGS. 6(e) to 6(h). The system microcomputer 11 changes the second filter in the loop filter 14 to the first filter used in the normal operation. Moreover, the system microcomputer 11 controls the program frequency divider 13 to operate with a predetermined hopping pattern, in synchronization with the hopping pattern on the transmitter side.

Thus, a desired wave signal is received. It is finally judged whether or not the desired wave signal is a target signal based on information data contained within one frame of the desired wave signal.

If the resultant desired wave signal is again ensured to be the target signal, it is regarded that the initial synchronization has been established so that communications with the receiver can be conducted.

If it is finally judged that the resultant desired wave signal is not the target signal, based on information data contained within one frame, the time-constant measuring circuit 17 changes the first filter in the loop filter 14 to the second filter used for initial synchronization establishment. Then, the above desired wave signal estimating process is repeated again.

The receiver 1 according to the present embodiment uses as the loop filter 14 in the PLL 12 the first filter and the second filter. That is, the first filter has a high rate time-constant and is used in the time of normal data communications. The second filter has a time-constant slower than the first filter, which is set to sweep all the frequency channels within at least the residence time $t_1$ per frequency in a hopping pattern.

The second filter in the loop filter 14 is selected at the operation for initial synchronization establishment. Thus, the sampling is continuously executed once or plural times over all the frequency channels. The desired wave signal is estimated during the sampling period, based on the signal strength, modulation system and hopping pattern of a received signal received by the estimation means 7.

Conventionally, the initial synchronization establishment requires ten to several ten times (depending on the number of channels) the residence time $t_1$ of a hopping pattern in the FH system. However, the above estimation allows the time for the initial synchronization establishment to be reduced to a very short time being several times the residence time $t_1$ of one frequency.

In the above embodiment, the estimation means 7 includes the signal strength measuring circuit 8 and the modulation-system discriminator 9. The estimation circuit 10 estimates a desired wave signal based on the signal level output from the signal strength measuring means 8 and the modulation system detected by the modulation-system discriminator 9. However, it is not essential to provide the signal strength measuring circuit 8 and the modulation-system discriminator 9.

For example, the signal strength measuring circuit 8 only may be used. Thus, the estimation circuit 10 can estimate a desired wave signal by comparing the presence of the signal-strength output signal from the signal strength measuring circuit 8 and the hopping pattern.

Alternatively, the modulation-system discriminator 9 only may be used. Thus, the estimation circuit 10 can estimate a desired wave signal by comparing the presence of the signal in the same modulation system and the hopping pattern.

In the above embodiment, the second filter to be used at the operation for initial synchronization establishment is provided to the loop filter 14 in the PLL 12. However, the second filter is not essential if the local oscillation signal of the PLL circuit 12 can be controlled to be in a sweep mode.

Figure 7:
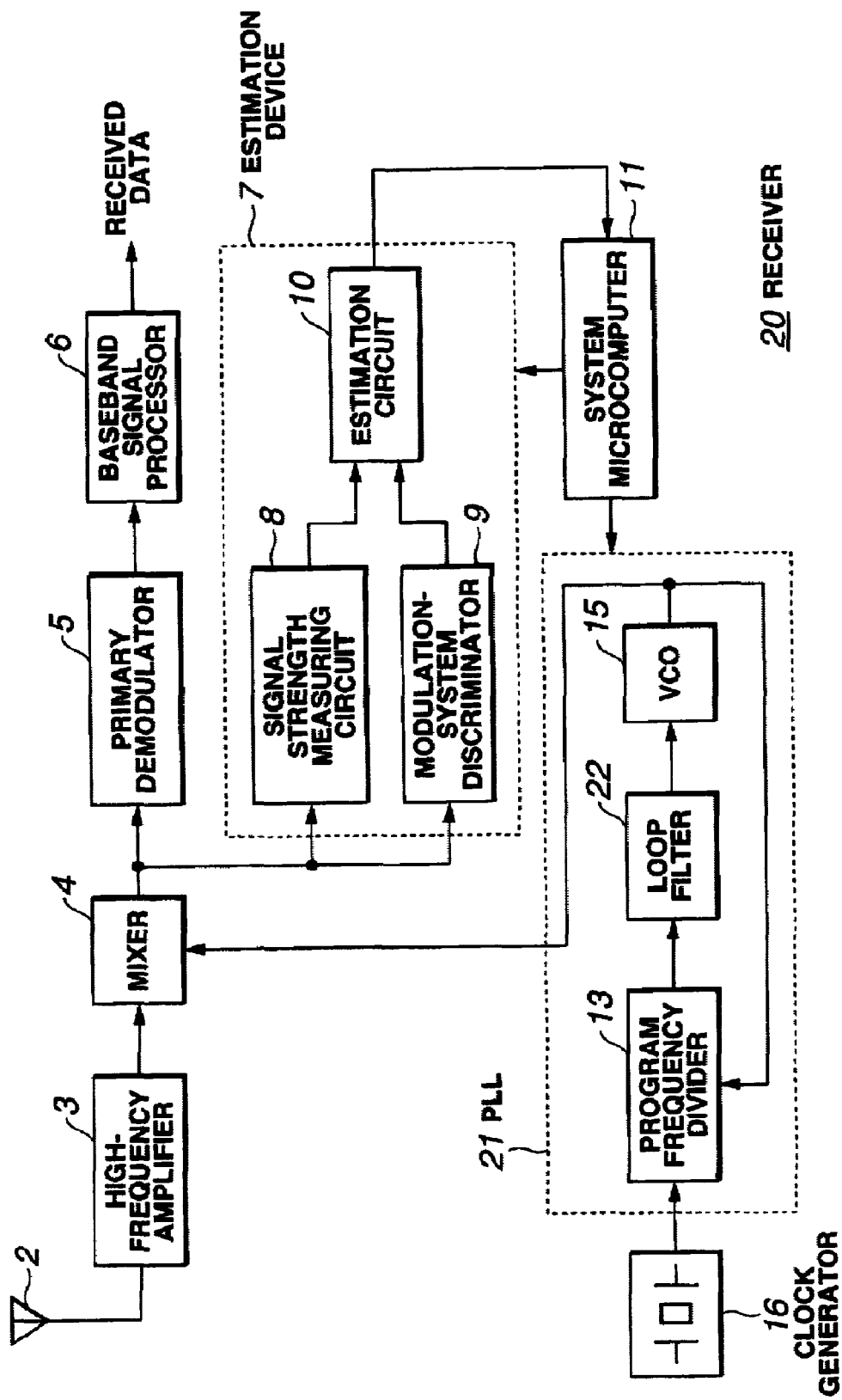
FIG. 7 is a block diagram illustrating a receiver that conducts communications in a frequency hopping system, according to an embodiment of the present invention.

FIG. 7 is a block diagram illustrating the receiver according to another embodiment of the invention.

Like numerals are attached to the same constituent elements as those in FIG. 1 and hence the duplicate explanation will be omitted here.

Referring to FIG. 7, the PLL 21 (broken lines) has a closed loop configured of the program frequency divider 13, a loop filter 22 and the VCO 15.

The loop filter (low-pass filter) 22 includes a time-constant circuit formed of, for example, a capacitor and a resistor.

That is, in the receiver 20 shown in FIG. 7, the time constant of the loop filter in the PLL is not set to a slow rate at the operation for initial synchronization establishment, like the receiver 1 explained with FIG. 1. However, the estimation circuit 7 is designed to estimate a desired wave signal.

In such a case, since the time-constant of the loop filter 22 is finite, a changeover time always occurs while the frequency of the local oscillation signal output from the VCO 15 in the PLL 21 is switched for a new frequency channel.

Hence, at an operation for initial synchronization establishment, the system microcomputer 11 controls to sweep the frequency of the local oscillation signal output from the VCO 15 in the PLL 12 over the band of all the frequency channels. Thus, the estimation means 7 can estimate a desired wave signal based on the received signal during the changeover period, as described above.

In this embodiment, in order to estimate the desired wave signal positively by the estimation means 7, the system microcomputer 11 controls the program frequency divider 13 in such a way that the sweeping period (sampling period) of the local oscillation signal output from the PLL 21 is set to be a fraction of the residence time $t_1$ of a frequency in the hopping pattern. Moreover, the sweeping (sampling) is repeated over plural cycles of residence time $t_1$ in the hopping pattern. In such an operation, the desired wave signal of the self receiver can be estimated through comparison between residence times $t_1$ of a frequency channel in the self receiver and through comparison between hopping patterns, as described with FIG. 6.

In the above explanation, the signal strength comparison is performed, as shown in FIGS. 4 and 6, based on the promise that when there is a received signal, an arbitrary frequency channel is received with almost the same signal strength.

However, the signal strength of a received signal varies in time and from place to place in the environment where multi-pass fading occurs. In such a case, the variation mode of a received signal depends on frequency. For that reason, the problem is that if the signal strength at each frequency is evaluated without any processing, the frequency channel of a received signal temporarily attenuated due to fading cannot be detected.

Moreover, the problem is that when the signal strength at each frequency is detected by continuously varying the local oscillation frequency, fading similar to that in movement occurs even in the stationary state of the receiver.

The following embodiment according to the present invention is made to solve the above-mentioned problems and can perform received channel estimation more certainly.

Figure 8:
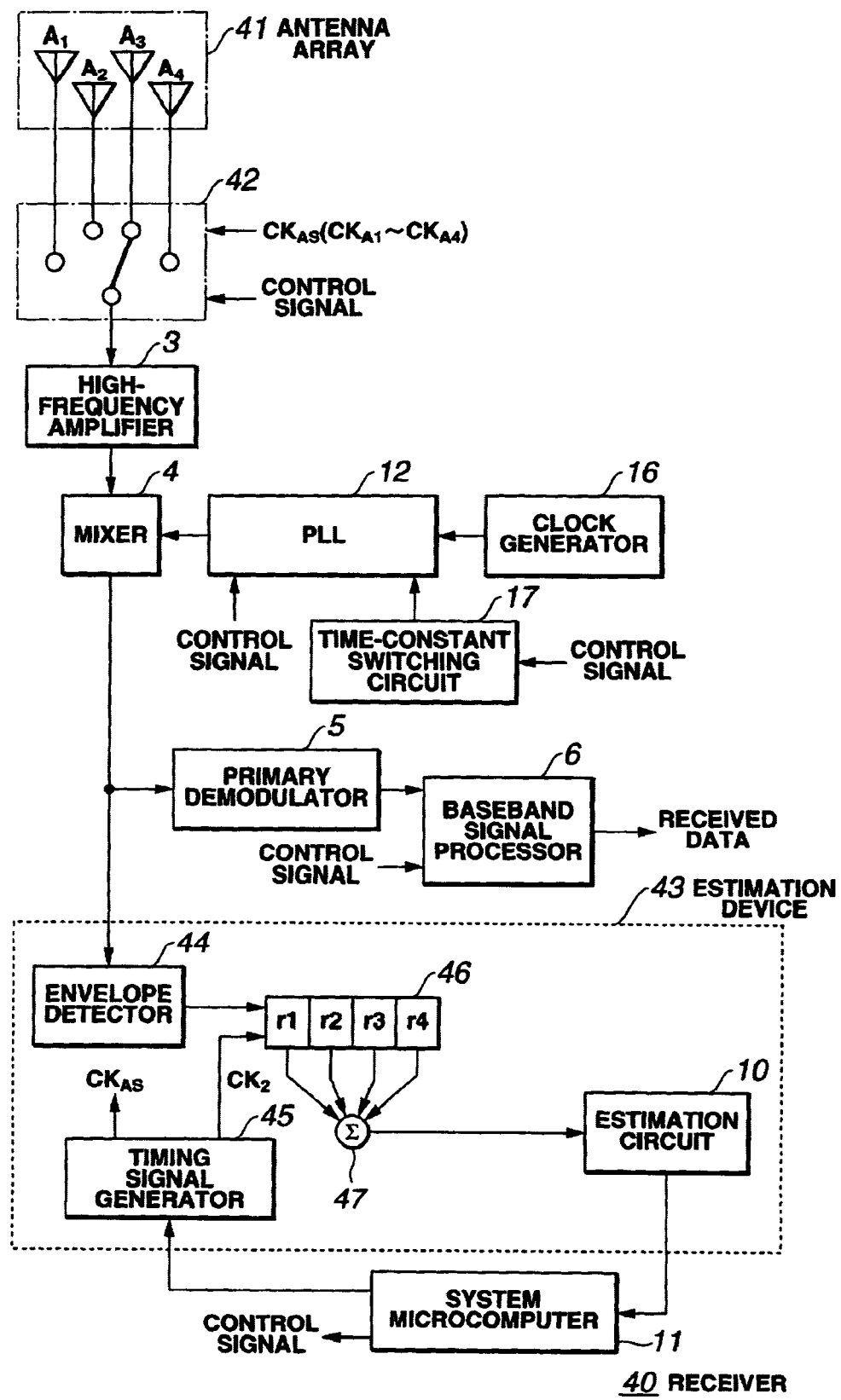
FIG. 8 is a block diagram illustrating a receiver that conducts communications in a frequency hopping system, according to another embodiment of the present invention.

FIG. 8 is a block diagram illustrating the receiver for communications in the frequency hopping system, according to still another embodiment of the present invention.

This embodiment will be described by referring to the embodiment shown in FIG. 1. Like numerals are attached to the same constituent elements as those in FIG. 1 and hence the duplicated explanation will be omitted here.

Numeral 40 represents a receiver. Numeral 41 represents an antenna array. Referring to FIG. 8, plural (n=4) receiving antennas $A_1$ to $A_4$ are arranged at predetermined intervals, for example, are in a matrix form on the plane and spaced apart by $\lambda/2$. Numeral 42 represents an antenna switch that selectively switches the received signals of the receiving antennas $A_1$ to $A_4$ in a time division mode using a changeover timing signal $CK_{AS}$ when initial synchronization is established, thus outputting a selected received signal.

Numeral 43 represents received channel estimation means. Numeral 44 represents an envelope detection circuit, acting as a signal strength measuring circuit, that detects the envelope level of a received signal output from the mixer 4 to output a digital value. Numeral 45 represents a timing signal generator that outputs the changeover timing signal $CK_{AS}$ to the antenna switch 42 under control of the system microcomputer 11 and then outputs the timing signal $CK_2$ to the shift register 46 (to be described later).

Figure 9:
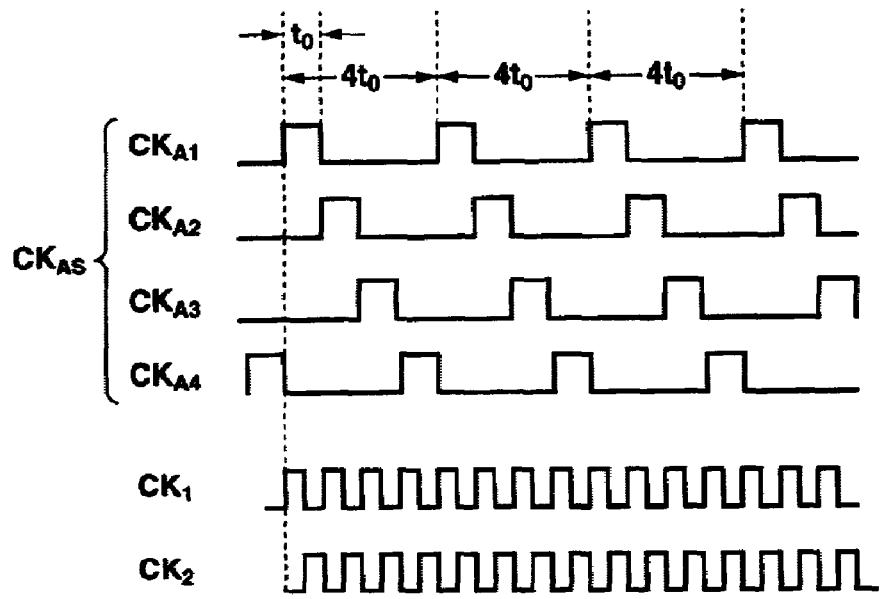
FIG. 9 is a waveform diagram illustrating the switching timing signal $CK_{AS}$ and input timing signal $CK_2$ for the receiving antennas $A_1$ to $A_4$ shown in FIG. 8.

FIG. 9 is a waveform diagram showing a mutual relationship between a changeover timing signal $CK_{AS}$ for each of antennas $A_1$ to $A_4$ and an input timing signal $CK_2$, shown in FIG. 8.

The input timing signal $CK_1$ of the period $t_0$ is frequency divided to create four types of timing signals $CK_{AS}$ ($CK_{A1}$ to $CK_{A4}$) each of which the timing is shifted every selection period (one cycle) $t_0$.

The antenna switch 42 sequentially selects the received signals of the receiving antennas $A_1$ to $A_4$ with the timing signals $CK_{A1}$, to $CK_{A4}$ every one to the period $4t_0$ and then outputs the output as a received signal to the high-frequency amplifier 3.

Numeral 46 represents a shift register that captures and shifts the digital value of a detected envelope level every input timing signal $CK_2$. In the example shown in FIG. 8, register stages are prepared corresponding to the total number of the receiving antennas $A_1$ to $A_4$. The envelope level of a received signal respectively received by the receiving antennas $A_1$ to $A_4$ shifts through the stages $r_1$ to $r_4$, and is temporarily stored in any one of the stages. The function of the shift register 46 may be realized with a memory.

Numeral 47 represents an adder that adds the outputs of the respective stages in the shift registers 46. The adder 47 synthesizes the respective envelope levels of signals received with the receiving antennas $A_1$ to $A_4$ disposed at different positions.

The estimation circuit 10 basically resembles the estimation circuit shown in FIG. 1. The estimation circuit 10 holds the residence time $t_1$ and the frequency hopping pattern previously set to the receiver 40. The estimation circuit 10 estimates whether or not the received signal is a desired wave signal transmitted to the receiver 40, based on the signal strength of a received signal during sampling (sweeping), measured by the envelope detection circuit 44 when initial synchronization is established.

The modulation-system discriminator 9 shown in FIG. 1 may be provided to receive the output of the mixer 4. However, referring to FIG. 8, the estimation circuit 10 estimates or identifies the primary modulation system based on the output from the signal strength measuring circuit 8, as described later.

For initial synchronization establishment, the timing signal generator 45 selects the antenna switch 42 under control of the system microcomputer 11.

In this case, since the time-constant switching circuit 17 slows down or prolongs the time constant of the loop filter, the local oscillation frequency of the PLL 12 is swept at a relatively low rate. Moreover, the envelope level is sampled according to the frequency spectrum of the signal received between the frequency channels $f_0$ to $f_9$. The antenna switch 42 is not changed at the normal receiving time. However, the high-frequency amplifier 3 receives the received signal of one of the receiving antennas and then inputs it to the primary demodulator 5 via the mixer 3, in a manner similar to that shown in FIG. 1.

The antenna switch 42 sequentially changes the receiving spot in time division mode. Hereinafter, this changeover operation is called "space hopping". The rate of the space hopping (the reciprocal of the selection period $t_0$ during which a received signal transmitted from a certain antenna is being selected) is slower, compared with the symbol rate (the reciprocal of one symbol period). The rate of the space hopping may be a fraction to several tenths of the symbol rate. This space hopping is defined as low-rate space hopping.

When the space hopping rate is sufficiently larger than the symbol rate, the configuration of the signal strength measuring circuit 8 shown in FIG. 8 may not be used. Instead, the envelope level of a received signal in the intermediate band output from the mixer 4 is detected for each antenna. Thereafter, the detected envelope levels for respective antennas are synthesized through an addition process.

In the sampling (sweeping) method shown in FIG. 4, all the frequency channels are sampled once within the residence time $t_1$ of one frequency channel in the hopping pattern (see the sweeping duration T1 in FIG. 3). In the sampling (sweeping) method shown in FIG. 6, all the frequency channels are sampled several times within the residence time $t_1$.

In either case, sampling (sweeping) is repeated plural times, over the duration corresponding to several times the residence time $t_1$. Thus, not only the frequency channel during one residence time $t_1$ in the hopping pattern but the hopping pattern over plural residence times $t_1$ can be detected.

In either case, the space hopping rate is set during one sweep period T1 in such a way that at least two antennas or preferably all the antennas $A_1$ to $A_4$ can detect the envelope levels of received signals in the frequency channels $f_0$ to $f_9$.

Figure 10:
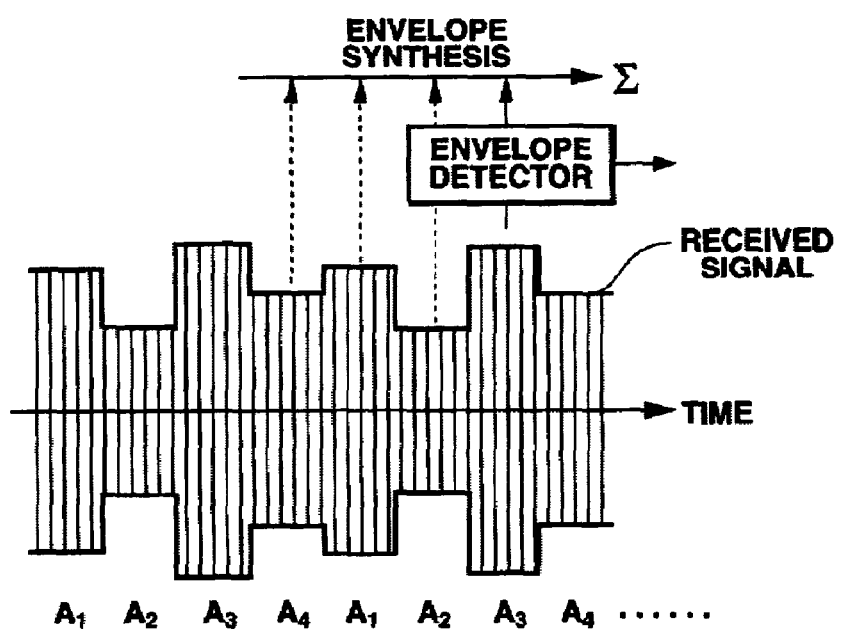
FIG. 10 is a waveform diagram schematically illustrating a received signal output from the mixer 4 at a space hopping time and the envelope synthesis period thereof.

FIG. 10 is a waveform diagram schematically illustrating a received signal output from the mixer 4 and the envelope synthesis duration thereof at a space hopping time.

The received signals from the receiving antennas $A_1$ to $A_4$ are switched during each selection period $t_0$ to sequentially output them. Each received signal, or one converted into a signal on an intermediate band by the mixer 4, is primary modulated.

The envelope detector 44 is an example of the signal strength measuring circuit. The envelope detection is performed by full-wave or half-wave rectifying received signals using a rectifying diode and a smoothing circuit or by performing the calculation equivalent to the envelope detection.

When synchronization detection can be performed using a reference frequency signal generator, the envelope level may be obtained by synchronously detecting a received signal, calculating the I component in phase with the reference frequency signal and the Q component perpendicular to the I component, and then calculating the amplitudes of the received signal (complex envelope).

The detected envelope level is passed through a low-pass filter so as to prevent interference with components of a received signal of an adjacent receiving antenna. The characteristics of the low-pass filter may be, for example, one that can pass the frequency band (Nyquist band) of a half of the space hopping rate.

The envelope level detector 44 is used as a signal strength measuring circuit. In an alternative example, the received signal is squared and then is passed through the low-pass filter. Thus, the average power is calculated every selection period to during which each receiving antenna is selected. The average power or the square root thereof may be output as signal strength. In this case, the following circuits may embodied in a similar configuration.

The output from the envelope detector 44 is sampled at a rising time of the input timing signal $CK_2$ once during each selection period $t_0$. The sampled signal is input to the shift register 46. The rising phase of the input timing signal $CK_2$ is set with respect to the timing signal $CK_1$ to obtain a suitable input timing according to the delay characteristics of the low-pass filter in the envelope detector 44.

Each stage in the shift register 46 stores the envelope level of a received signal during the selection period of each of the receiving antennas $A_1$ to $A_4$ and then updates it through sequentially shifting. The adder 47 adds the envelope levels output by each stage to synthesize the envelope levels of received signals received by the plural receiving antennas $A_1$ to $A_4$.

According to an example of simulation, when the envelope level of a received signal is detected with a single receiving antenna, the discrete values of the envelope level is several 10 dB. However, the discrete values are compressed to several dB by synthesizing through addition the envelope levels of received signals from nine receiving antennas of which the receiving spots are arranged in a matrix form at $\lambda/2$ intervals.

If an amplitude modulation system such as FSK modulation is used as the primary modulation system, the envelope level to be detected is constant. The use of the space hopping allows variations in synthesized envelope level to be decreased even at different frequencies of the received signal. Therefore, the signal strength can be detected with stability. The estimation circuit 10 can effectively estimate the presence of a received signal in each frequency channel and a hopping pattern, based on the signal strength. However, since the phase of a received signal may rather vary to an arbitrary value through the space hopping, it is difficult to perform the primary modulation system without taking measures.

On the other hand, BPSK (two-phase modulation) and DPSK (differential phase modulation) are used as the primary modulation system and the modulation system in which the amplitude is not constant due to band limitation is used, the envelope level of a received signal is not held constant.

However, when the mixer 4 integrates the received signal converted into a frequency of the intermediate frequency band to detect the envelope level, variations in envelope level are decreased. Thereafter, in a similar manner, the frequency channel existing in an received signal can be estimated by synthesizing the envelope levels of received signals from respective receiving antennas.

Even in the case of no integration procedure, the frequency channel can be estimated by evaluating the synthesized envelope level based on the average value and the discrete value thereof.

The estimation circuit 10 holds a frequency hopping pattern set in the receiver 40 and the residence time $t_1$ staying in one frequency channel thereof. Therefore, even in the sampling (sweeping) of FIG. 6 and FIG. 4, the sweeping (sampling) is repeated once or more for the residence time $t_1$. The signal strength is measured by implementing the sweeping during the period corresponding to plural times the residence time $t_1$. Thus, whether or not the received signal is a desired wave signal can be estimated based on the number of times the time changing pattern of the frequency channel of a received signal and/or the same frequency channel is continuously detected.

When the received signal is estimated to be a desired wave signal, the desired wave signal is received by changing the time-constant of the loop filter in the PLL 12. Finally, whether or not the received signal is the desired wave signal is decided based on the information data contained in one frame of the desired wave signal. If yes, it is regarded that initial synchronization has established so that communications between the receiver and the transmitter are conducted.

Even in the normal receiving mode, the estimation means 10 can monitor erroneous synchronization of the frequency hopping pattern by always monitoring the frequency channel with the space hopping.

In the above explanation, the receiving antennas are arranged as the antenna array 41 in a matrix form and at equal space intervals of $\lambda/2$. However, it is not always necessary that the spacing between the receiving antennas is $\lambda/2$. For example, the spacing between the receiving antennas is $\frac{1}{4}\lambda$ or $\lambda$. Moreover, it is not necessary to arrange the receiving antennas at equal intervals. For example, the receiving antennas may be arranged in straight line.

This embodiment does not use the modulation-system discriminator 9 shown in FIGS. 1 and 7. However, as described above, the estimation circuit 10 can identify the fixed-amplitude modulation system based on the synthesized envelope level. As a result, if the system is the fixed-amplitude modulation system, it is estimated that the modulation is FSK. If the amplitude is not fixed, it is estimated that the modulation is BPSK or DPSK.

In 2.4 GHz spectrum spread (SS) band, there are various systems including the direct sequence (DS) system and the frequency hopping (FH) system. When the spread spectrum signal in the DS system is being received, a large envelope level are not detected in a specific frequency channel even if the local oscillation signal is swept because the spectrum spreads broadly. Hence, it is possible to estimate whether or not the received signal is a received signal in the DS system or a received signal in the FH system.

In order to output received data in the baseband signal processor 6, it is necessary to previously know the encoding system, that is, the so-called baseband modulation system or error detection correction system. However, types of the SS system or maker requirements used in the 2.4 GHz spread spectrum (SS) band are limited in number. Hence, there are relationships between the primary modulation system, the system regarding frequency channel, frequency hopping rate (the reciprocal of residence time $t_1$), frequency hopping pattern, or the like, and the baseband modulation system or error detection correction system.

If one or more of the primary modulation system, frequency channel, frequency hopping rate, frequency hopping pattern, and the like can be estimated, the baseband modulation system or error detection correction system can be estimated based on the estimated information. That is, if the envelope in the DS system or FH system, the primary modulation system in FSK or PSK, or the states of the hopping pattern and the hopping rate in an envelope in, for example, the FH system, are estimated, it is sufficient to specify the received signal.

Therefore, received data can be output through merely measuring the signal strength.

The above explanation has been made on the understanding that the embodiment explained with reference to FIG. 1. Alternatively, the explanation may be made on the understanding that the embodiment explained with reference to FIG. 7.

Moreover, in the embodiments explained with reference to FIGS. 1 and 7, the envelope level detector 44 in FIG. 8 may be used as the signal strength measuring circuit 8.

In the embodiments of the present invention, the spread spectrum communication has been explained as an example. However, the present invention is not restricted to the above embodiments but may be applicable to various radio communication systems. Instead of the FH system, even in the system where the transmitter conducts communications using a vacant channel of plural frequency channels, the desired wave signal can be estimated. In this case, the PLL 12 executes the sampling (sweeping) over all the frequency channels at the operation of initial synchronous establishment. The estimation means 7 detects whether or not the signal strength and the modulation system of a received signal are identified during the sweeping period. In this estimation, if the estimation means 7 estimates, for example, plural signals as desired wave signals, it may be judged whether or not the received signal is finally a desired wave signal based on information data contained within one frame of each of the desired wave signals.

According to the present invention, as described above, when the frequency of an output signal output from the PLL is set to a received channel corresponding to the transmission channel of a transmission signal, the frequency of the output from the PLL is switched from the received channel on one terminal to the received channel from the other terminal. Thus, the received channel corresponding to the transmission channel is estimated based on the received signal received during the changeover period.

Therefore, the estimation means estimates the received channel corresponding to a transmission channel. Since initial synchronization is established based on the estimation result, the time required for initial synchronization can be shortened.

Moreover, when the frequency of an output signal output from the PLL is set to a received channel corresponding to the transmission channel of a transmission signal, the time constant of the filter in the PLL is changed from the first time constant to the second time constant. Meanwhile, the received channel corresponding to the transmission channel is estimated based on the received signal received in the changeover period during which the frequency of an output signal from the PLL is switched from the received channel on one terminal to the received channel from the other terminal.

In this case, the estimation means estimates a transmission signal corresponding to a transmission channel. Thus, the time required for initial synchronization can be shortened by establishing initial synchronization based on the estimation result.

Particularly, in the case where the communication system is the frequency hopping system for spectrum communications, the estimation means estimates a received channel from a received signal through, for example, plural sampling operations while it is referring to the hopping pattern. Thus, the received channel corresponding to the transmission channel can be estimated in a very short time and positively. Finally, the time required initial synchronization can be more shortened.

Moreover, the present invention has the advantage in that the receiver can be realized under control of the control means. Hence, the receiver can be realized in a simple configuration and at low costs, without any addition of a new circuit or by adding filters each with a different time constant.

The signal strength synthesis using the space hopping allows variations in signal strength for each frequency channel caused by multi-path fading to be decreased. Thus, the received channel estimation can be realized with stability and in a simplified configuration and at low costs.

What is claimed is:

1. A receiver that receives transmission signals transmitted in a communication system using plural frequency channels, comprising:
    a phase locked loop (PLL) having an output signal being formed of differential information output means for frequency dividing an input signal in a predetermined frequency division ratio to obtain a frequency-divided signal and for outputting differential information between said frequency-divided signal and a clock pulse, filter means for outputting a differential signal voltage corresponding to said differential information, and a voltage-controlled oscillator for controlling a frequency of said output signal according to said differential signal voltage;
    receiver means for receiving a transmission signal having as a transmission frequency the frequency of the output signal output from said PLL;
    estimation means for estimating a receiving channel corresponding to the transmission frequency of said transmission signal; and
    control means for controllably sampling a plurality of times the frequency of said output signal of said PLL from a receiving channel at one frequency to a receiving channel at another frequency when the frequency of the output signal from said PLL is set to a frequency of the receiving channel corresponding to the transmission frequency of said transmission signal,
    wherein said estimation means estimates the receiving channel corresponding to the transmission frequency for said transmission signal based on a received signal received by said receiver means, in the period during which said PLL samples from the receiving channel at one frequency to the receiving channel at another frequency, and
    wherein said estimation means comprises:
    a signal strength measuring circuit for measuring the signal strength of said received signal; and
    an estimation circuit for estimating the signal strength measured in said signal strength measuring circuit and the receiving channel corresponding to the transmission frequency of said transmission signal based on a hopping pattern in said receiver.

2. A receiver defined in claim 1, wherein said estimation means comprises:
    a modulation-system discriminator for discriminating a modulation system of said received signal; and
    an estimation circuit for estimating a discrimination result by said modulation-system discriminator and the receiving channel corresponding to the transmission frequency of said transmission signal based on the hopping pattern in said receiver.

3. A receiver that receives transmission signals transmitted in a communication system using plural frequency channels, comprising:
    a phase locked loop (PLL) having an output signal being formed of differential information output means for frequency dividing an input signal in a predetermined frequency division ratio to obtain a frequency-divided signal and for outputting differential information between said frequency-divided signal and a clock pulse, filter means comprising a first filter to which a first time constant is set and a second filter to which a second time constant slower than said first time constant is set for outputting a differential signal voltage corresponding to said differential information, and a voltage-controlled oscillator for controlling a frequency of said output signal according to said differential signal voltage;
    time-constant switching means for switching between the first and second time constants of said filter means;
    receiver means for receiving a transmission signal having as a transmission frequency the frequency of the output signal output from said PLL;
    estimation means for estimating a receiving channel corresponding to the transmission frequency of said transmission signal; and
    control means for performing switching control such that said time-constant switching means switches from said first filter to said second filter when the frequency of the output signal from said PLL is set to the frequency of the receiving channel corresponding to the transmission frequency of said transmission signal and for controllably sampling a plurality of times the frequency of the output signal output from said PLL from a receiving channel at one frequency to a receiving channel at another frequency, wherein said estimation means estimates the receiving channel corresponding to the transmission frequency for said transmission signal based on a received signal received by said receiver means, in the period during which said second filter samples at low rate the output signal output from said PLL from the receiving channel at one frequency to the receiving channel at another frequency, and wherein said estimation means comprises:

a signal strength measuring circuit for measuring a signal strength of said received signal; and an estimation circuit for estimating the signal strength measured in said signal strength measuring circuit and the receiving channel corresponding the transmission frequency of said transmission signal based on a hopping pattern in said receiver.

4. A receiver that receives transmission signals transmitted in a communication system using plural frequency channels, comprising:

a phase locked loop (PLL) being formed of differential information output means for frequency dividing an input signal in a predetermined frequency division ratio to obtain a frequency-divided signal and for outputting differential information between said frequency-divided signal and a clock pulse, filter means comprising a first filter to which a first time constant is set and a second filter to which a second time constant slower than said first time constant is set for outputting a differential signal voltage corresponding to said differential information, and a voltage-controlled oscillator for controlling a frequency of said output signal according to said differential signal voltage;

time-constant switching means for switching between the first and second a time constants of said filter means;

receiver means for receiving a transmission signal having as a transmission frequency the frequency of the output signal output from said PLL;

estimation means for estimating a receiving channel corresponding to the transmission frequency of said transmission signal; and control means for performing switching control such that said time-constant switching means switches said filter means from said first filter to said second filter when the frequency of the output signal from said PLL is set to a frequency of the receiving channel corresponding to the transmission frequency of said transmission signal and for controllably sampling a plurality of times the frequency of the output signal output from said PLL from a receiving channel at one frequency to a receiving channel at another frequency, wherein said estimation means estimates the receiving channel corresponding to the transmission frequency for said transmission signal based on a received signal received by said receiver means, in the period during which said second filter samples at low rate the output signal output from said PLL from the receiving channel at one frequency to the receiving channel at another frequency, and wherein said estimation means comprises:

a modulation-system discriminator for discriminating a modulation system of said received signal; and an estimation circuit for estimating a discrimination result by said modulation-system discriminator and the receiving channel corresponding to the transmission channel of said transmission signal based on a hopping pattern in said-receiver.

5. A receiver that receives transmission signals transmitted in a communication system using plural frequency channels, comprising:

a phase locked loop (PLL) being formed of differential information output means for frequency dividing an input signal in a predetermined frequency division ratio to obtain a frequency-divided signal and for outputting differential information between said frequency-divided signal and a clock pulse, filter means comprising a first filter to which a first time constant is set and a second filter to which a second time constant slower than said first time constant is set for outputting a differential signal voltage corresponding to said differential information, and a voltage-controlled oscillator for controlling a frequency of an output signal according to said differential signal voltage;

time-constant switching means for switching between the first and second a time constants of said filter means;

receiver means for receiving a transmission signal having as a transmission frequency the frequency of the output signal output from said PLL;

estimation means for estimating a receiving channel corresponding to the transmission frequency of said transmission signal; and control means for performing switching control such that said time-constant switching means switches said filter means from said first filter to said second filter when the frequency of the output signal from said PLL is set to a frequency of the receiving channel corresponding to the transmission frequency of said transmission signal and for controllably sampling a plurality of times the frequency of the output signal output from said PLL from a receiving channel at one frequency to a receiving channel at another frequency, wherein said estimation means estimates the receiving channel corresponding to the transmission frequency for said transmission signal based on a received signal received by said receiver means, in the period during which said second filter changes at low rate the output signal output from said PLL from the receiving channel at one frequency to the receiving channel at another frequency, and wherein said estimation means comprises:

a signal strength measuring circuit for measuring the signal strength of said received signal;

a modulation-system discriminator for discriminating a modulation system of said received signal; and an estimation circuit for estimating the signal strength measured by said signal strength measuring circuit, a discrimination result of said modulation-system discriminator, and the receiving channel corresponding to the transmission frequency of said transmission signal based on a hopping pattern in said receiver.

6. A receiver that receives transmission signals transmitted in a communication system using plural frequency channels, comprising:

a plurality of receiving antennas for receiving said transmission signals;

a switching circuit for selectively switching outputs from said plurality of receiving antennas in a time-division mode to output received signals;

a phase locked loop (PLL) for outputting frequency-controlled output signals;

receiver means for receiving a received signal from said switching circuit using as a local oscillation signal an output signal output from said PLL;

estimation means for estimating a receiving channel corresponding to a transmission frequency of a transmission signal; and control means for controllably sampling a frequency of said output signal from said PLL, from a receiving channel at one frequency to a receiving channel at another frequency when the frequency of the output signal from said PLL is set to a frequency corresponding to the transmission frequency for said transmission signal;

wherein said estimation means includes a signal strength measuring circuit for measuring a signal strength of said received signal every unit period during which each of said plurality of receiving antennas is selected and then synthesizing said signal strengths over said unit period;

said estimation means estimating the receiving channel corresponding to the transmission frequency for said transmission signal based on a synthesized signal strength in the period during which the frequency of said output signal from said PLL is sampled between a frequency corresponding to the receiving channel at one frequency and the receiving channel at another frequency.

7. A receiver that receives transmission signals transmitted in a communication system using plural frequency channels, comprising:

a plurality of receiving antennas for receiving said transmission signals;

a switching circuit for selectively switching outputs from said plurality of receiving antennas in a time-division mode to output a received signal;

a phase locked loop (PLL) for outputting frequency-controlled output signals, said PLL including a loop filter;

receiver means for receiving a received signal from said switching circuit, using as a local oscillation signal an output signal output from said PLL;

estimation means for estimating a receiving channel corresponding to a transmission frequency of a transmission signal; and control means for switching a time constant of said loop filter when a frequency of the output signal from said PLL is set to a frequency corresponding to the transmission frequency of said transmission signal and controllably sampling the frequency of said output signal from said PLL, from a receiving channel at one frequency to a receiving channel at another frequency;

wherein said estimation means includes a signal strength measuring means for measuring a signal strength of said received signal every unit selection period during which an output of each of said plurality of receiving antennas is selected, and synthesizing said signal strengths over said unit selection period;

said estimation means estimating the receiving channel corresponding to the transmission frequency for said transmission signal based on a signal strength synthesized in the period during which said switched time constant loop filter changes the frequency of said output signal from said PLL, from a frequency corresponding to the receiving channel at one frequency to the receiving channel at another frequency.

8. A receiver defined in claim 6 or 7, wherein said communication system comprises a frequency hopping system for spread spectrum communication.

9. A receiver defined in claim 8, wherein said estimation means estimates the receiving channel corresponding to the transmission channel for said transmission signal based on said signal strength synthesized and a hopping pattern in said frequency hopping system.

* * * * *